United States Patent
Syu et al.

(10) Patent No.: US 8,817,206 B2
(45) Date of Patent: Aug. 26, 2014

(54) BACKLIGHT MODULE AND DISPLAY APPARATUS THEREOF

(71) Applicant: Wistron Corporation, New Taipei (TW)

(72) Inventors: Jyun-Sheng Syu, New Taipei (TW); Chun-Yu Kuan, New Taipei (TW); Tzu-Ting Hsia, New Taipei (TW); Jing-Sian Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 163 days.

(21) Appl. No.: 13/677,329

(22) Filed: Nov. 15, 2012

(65) Prior Publication Data
US 2013/0335678 A1    Dec. 19, 2013

(30) Foreign Application Priority Data

Jun. 18, 2012  (TW) .............................. 101121723 A

(51) Int. Cl.
*G02F 1/1333* (2006.01)
*G02F 1/1335* (2006.01)
*F21V 13/02* (2006.01)
*G02B 6/00* (2006.01)

(52) U.S. Cl.
CPC .......... *F21V 13/02* (2013.01); *G02F 1/133615* (2013.01); *G02B 6/00* (2013.01)
USPC .............................................. 349/64; 349/65

(58) Field of Classification Search
USPC ....................................................... 349/64–65
See application file for complete search history.

(56) References Cited

U.S. PATENT DOCUMENTS 7,722,224 B1    5/2010   Coleman et al.

*Primary Examiner* — Phu Vu
(74) *Attorney, Agent, or Firm* — Winston Hsu; Scott Margo

(57) ABSTRACT

A backlight module is for providing light to a liquid crystal panel having a visible region. The backlight module includes a light guide plate, light emitting units, a mesh dot layer, and a diffusing tape. The light emitting units are disposed at a position corresponding to a light entrance surface of the light guide plate for emitting light to the light entrance surface. The mesh dot layer is disposed on a bottom surface of the light guide plate. A side of the mesh dot layer corresponding to the light entrance surface is shifted inward by a first distance relative to a side of the visible region corresponding to the light entrance surface. The diffusing tape is attached onto the bottom surface corresponding to the light entrance surface for diffusing light in the light guide plate to a light exit surface of the light guide plate.

14 Claims, 6 Drawing Sheets

BACKLIGHT MODULE AND DISPLAY APPARATUS THEREOF

BACKGROUND OF THE INVENTION

1. Field of the Invention

The present invention relates to a backlight module and a display apparatus thereof, and more specifically, to a backlight module of shifting a mesh dot layer inward relative to a visible region of a liquid crystal panel and attaching a diffusing tape to a bottom of a light guide plate and a display module thereof.

2. Description of the Prior Art

Since liquid crystal molecules do not produce light themselves, a common method for driving a liquid crystal display device to display images involves utilizing a backlight module to provide light with sufficient brightness and uniform distribution to the liquid crystal display device. Therefore, a backlight module is one of the major components of a liquid crystal display device.

A conventional light emitting design of a backlight module could be as shown in FIG. 1 and FIG. 2. FIG. 1 is a diagram of a backlight module 10 according to the prior art. FIG. 2 is a bottom view of the backlight module 10 in FIG. 1. As shown in FIG. 1 and FIG. 2, the backlight module 10 includes a light guide plate 12 and a plurality of light emitting diodes 14. The plurality of light emitting diodes 14 is disposed at a position corresponding to a light entrance surface 16 of the light guide plate 12. Accordingly, light emitted by the light emitting diodes 14 could be incident into the light guide plate 12 via the light entrance surface 16, and then be guided by the light guiding design of the light guide plate 12 (e.g. utilizing a mesh dot layer 20 formed on a bottom surface 18 of the light guide plate 12 as shown in FIG. 2) so as to form a surface light source with sufficient brightness and uniform distribution.

However, since the light emitting diode 14 has a high directivity (its light emitting angle is about 120) and the area of the mesh dot layer 20 is usually greater than an area of a visible region 22 (depicted by dotted lines in FIG. 2) of a display panel, bright areas 24 and dark areas 26 may appear alternately on a region of the light guide plate 12 close to the light entrance surface 16 (as shown in FIG. 2) so as to cause a hotspot problem.

The aforesaid hotspot problem is usually solved by forming a micro structure (e.g. a continuous arc-shaped micro structure) on the light entrance surface 16 of the light guide plate 12 to increase the light emitting angle of the light emitting diode 14 relative to the light guide plate 12, or by disposing a mesh-dot compensation structure 28 (as shown in FIG. 3, which is a partial enlarged diagram of the mesh-dot compensation structure 28 being disposed on the light guide plate 12 in FIG. 2) on a position of the mesh dot layer 20 close to the light entrance surface 16. However, the aforesaid designs may cause a time-consuming and strenuous light-guide-plate manufacturing process.

SUMMARY OF THE INVENTION

An objective of the present invention is to provide a backlight module of shifting a mesh dot layer inward relative to a visible region of a liquid crystal panel and attaching a diffusing tape to a bottom of a light guide plate and a display module thereof for solving the aforesaid problem.

The present invention provides a backlight module for providing light to a liquid crystal panel having a visible region. The backlight module includes a light guide plate, a plurality of light emitting units, a mesh dot layer, and a diffusing layer. The light guide plate has a light exit surface, a bottom surface, and a light entrance surface. The light entrance surface is located between the light exit surface and the bottom surface. The light exit surface is opposite to the bottom surface. The plurality of light emitting units is disposed at a position corresponding to the light entrance surface of the light guide plate for emitting light to the light entrance surface. The mesh dot layer is disposed on the bottom surface of the light guide plate. A side of the mesh dot layer corresponding to the light entrance surface is shifted inward by a first distance relative to a side of the visible region corresponding to the light entrance surface. The diffusing tape is attached onto the bottom surface corresponding to the light entrance surface for diffusing light in the light guide plate to the light exit surface.

According to the claimed invention, the diffusing tape is attached to the bottom surface in a manner of being aligned with the light entrance surface, and the first distance is calculated according to the following equation: the first distance=(a width of the diffusing tape)+(a second distance)−(a third distance between the light entrance surface and the side of the visible region corresponding to the light entrance surface); the second distance=(a width of the light guide plate) *tan (an angle formed by a diffusing path of light inside the light guide plate and a normal of the light exit surface). The angle is less than or equal to a total-reflection critical angle of the light guide plate.

According to the claimed invention, the width of the diffusing tape is less than or equal to the third distance between the light entrance surface and the side of the visible region corresponding to the light entrance surface.

According to the claimed invention, the first distance is between 1 mm and 2.5 mm.

According to the claimed invention, the first distance is substantially equal to 2.5 mm.

The present invention further provides a display apparatus. The display apparatus includes a backlight module and a liquid crystal panel having a visible region. The backlight module is used for providing light to the liquid crystal panel. The backlight module includes a light guide plate, a plurality of light emitting units, a mesh dot layer, and a diffusing layer. The light guide plate has a light exit surface, a bottom surface, and a light entrance surface. The light entrance surface is located between the light exit surface and the bottom surface. The light exit surface is opposite to the bottom surface. The plurality of light emitting units is disposed at a position corresponding to the light entrance surface of the light guide plate for emitting light to the light entrance surface. The mesh dot layer is disposed on the bottom surface of the light guide plate. A side of the mesh dot layer corresponding to the light entrance surface is shifted inward by a first distance relative to a side of the visible region corresponding to the light entrance surface. The diffusing tape is attached onto the bottom surface corresponding to the light entrance surface for diffusing light in the light guide plate to the light exit surface.

In summary, the present invention utilizes the design in which the mesh dot layer located on the bottom surface of the light guide plate is shifted inward relative to the visible region of the liquid crystal panel, to prevent the bright areas and the dark areas from appearing alternately on the region of the light guide plate close to the light entrance surface. In such a manner, the aforesaid hotspot problem could be efficiently solved. Furthermore, the present invention could further utilize the diffusing tape to be attached to the bottom surface of the light guide plate corresponding to the light entrance surface, so that dark lines or dark bands caused by inward shift of the mesh dot layer relative to the visible region could also be eliminated. Accordingly, the backlight module provided by the present invention could greatly improve the image display quality and the visual comfort of the display apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
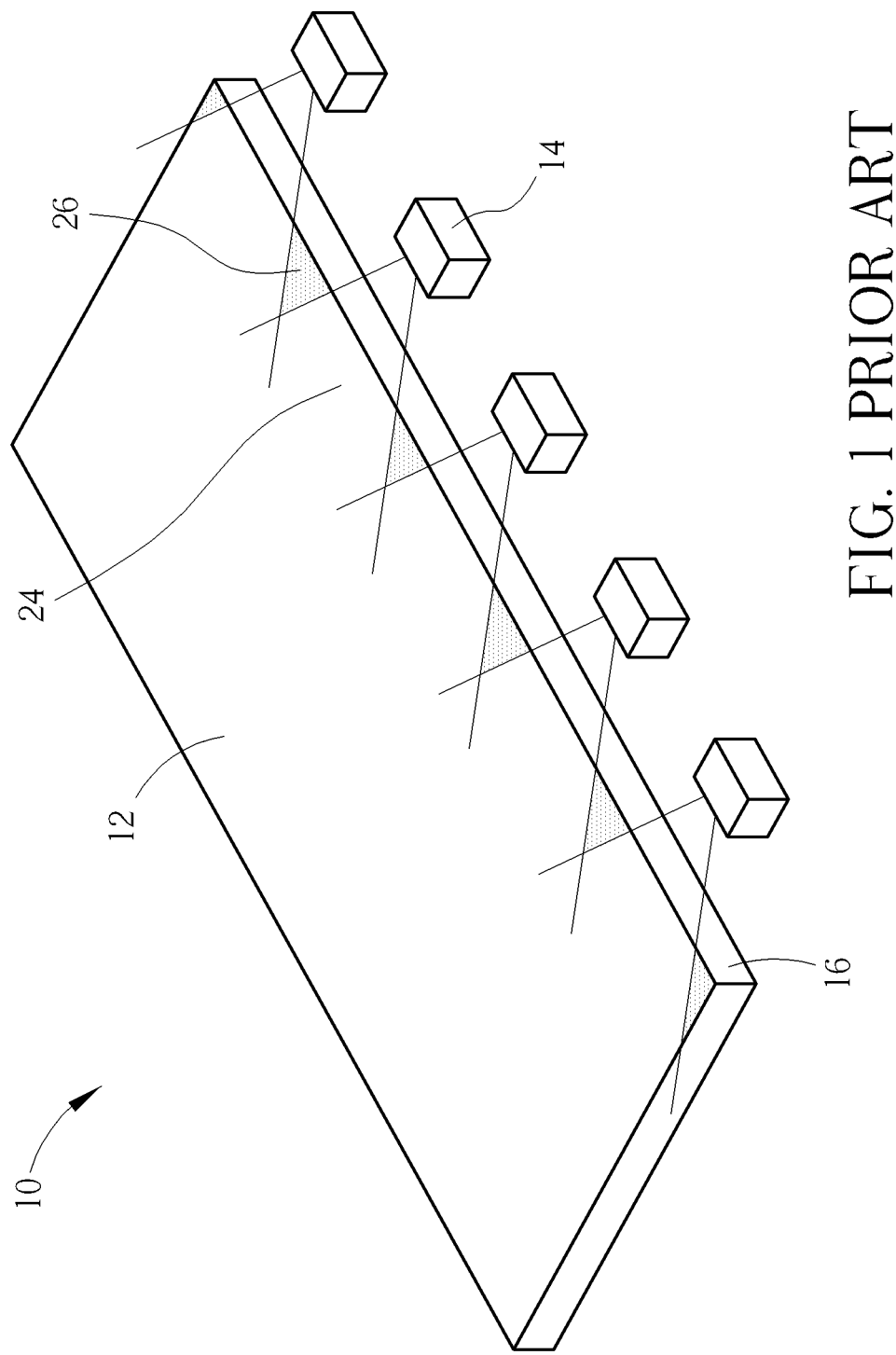
FIG. 1 is a diagram of a backlight module according to the prior art.
Figure 2:
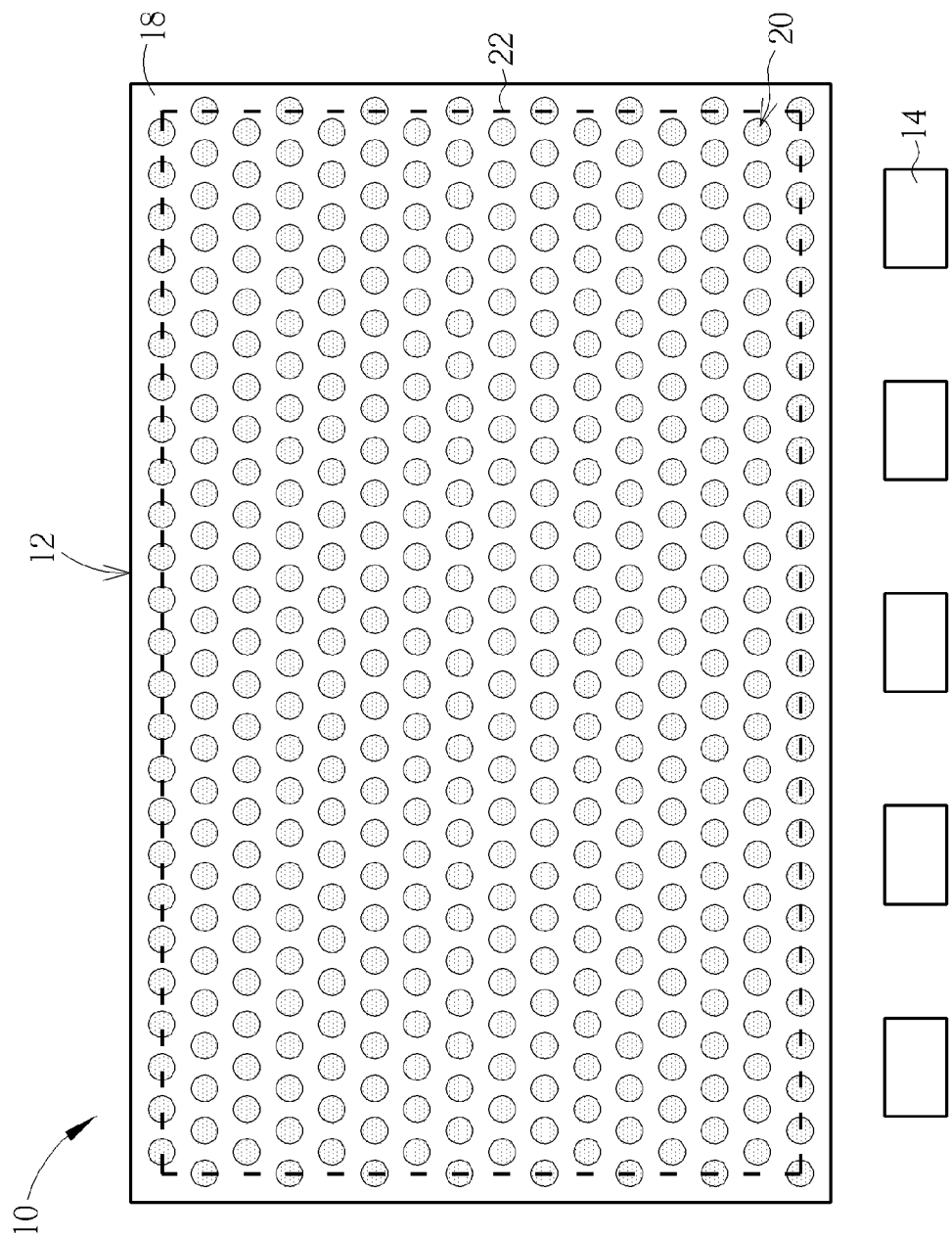
FIG. 2 is a bottom view of the backlight module in FIG. 1.
Figure 3:
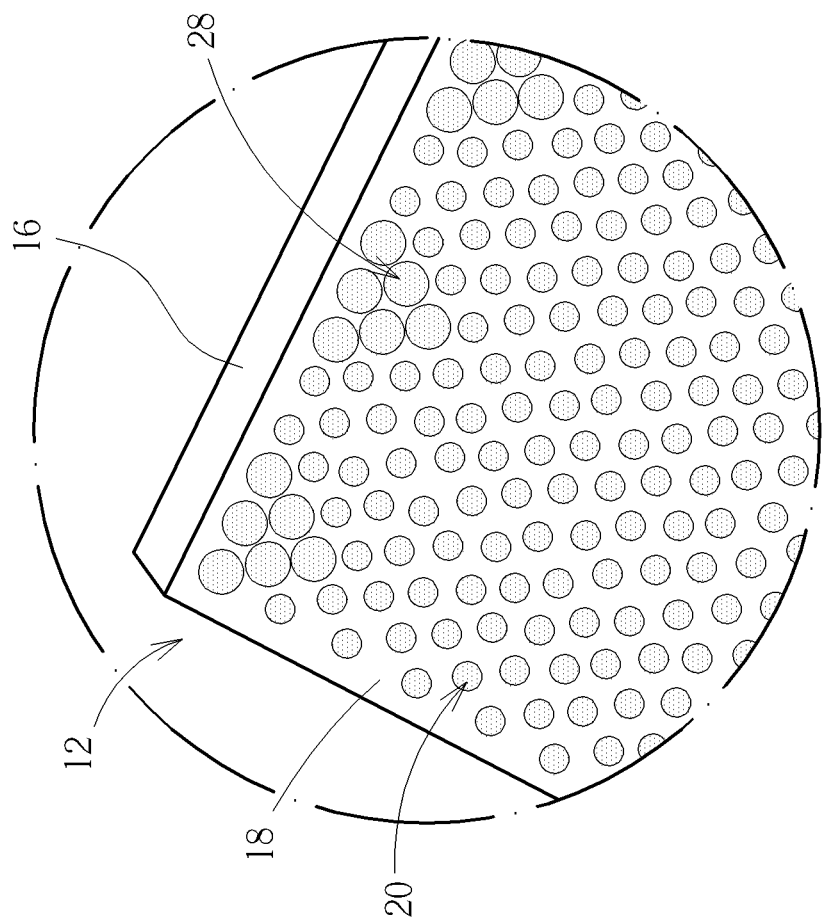
FIG. 3 is a partial enlarged diagram of a mesh-dot compensation structure being disposed on a light guide plate in FIG. 2.
Figure 4:
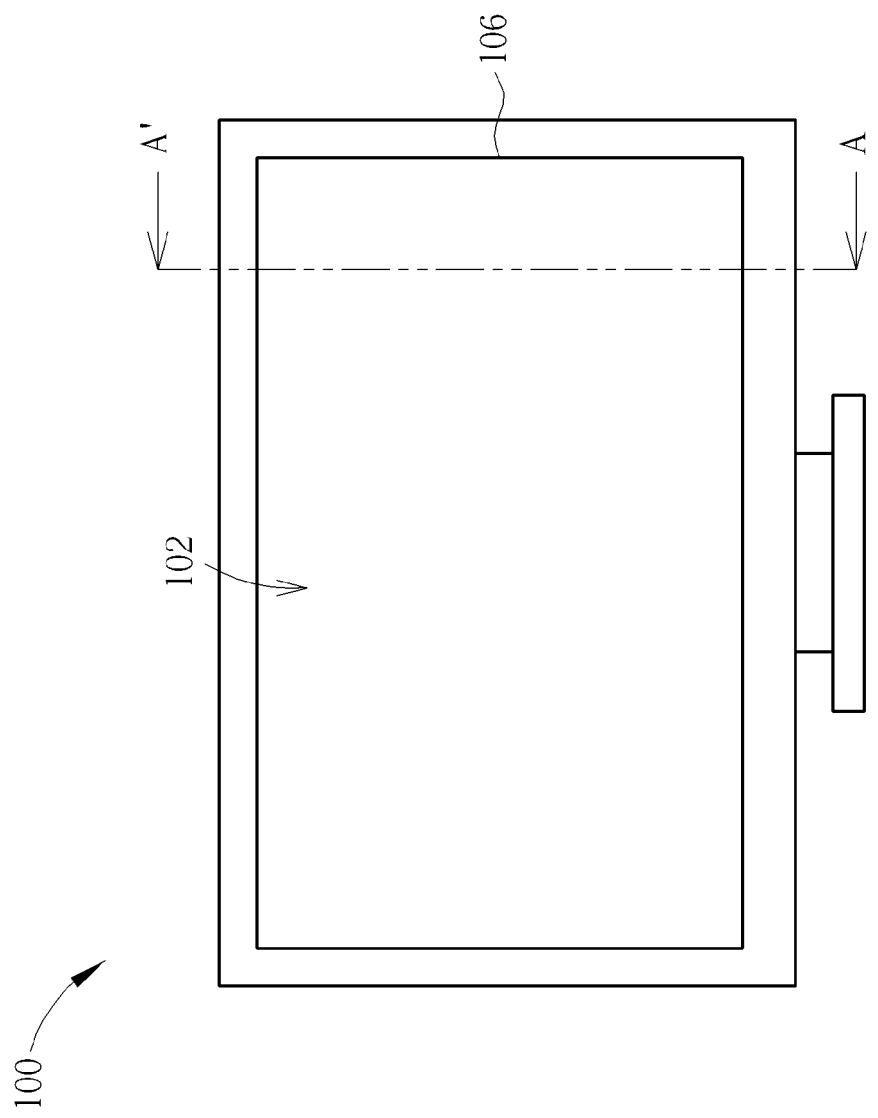
FIG. 4 is a diagram of a display apparatus according to an embodiment of the present invention.
Figure 5:
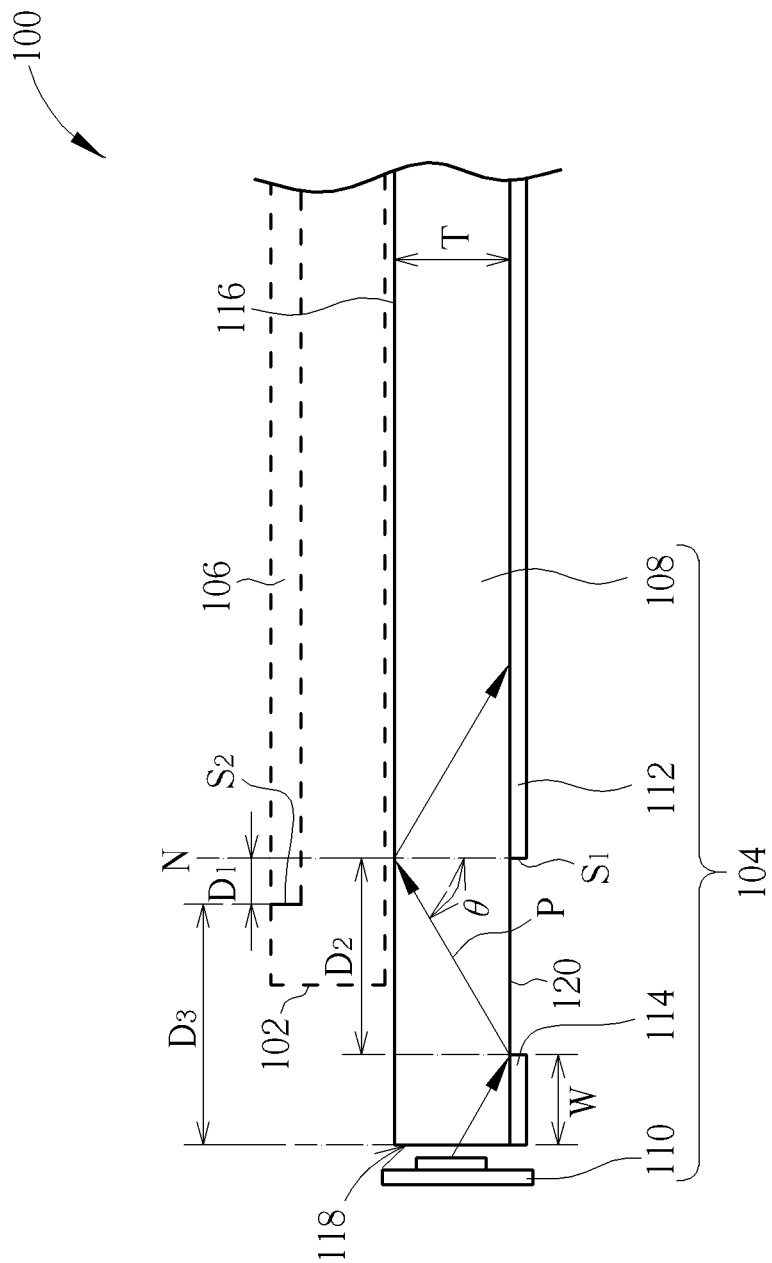
FIG. 5 is a partial sectional diagram of the display apparatus in FIG. 4 along a sectional line A-A'.

Please refer to FIG. 4 and FIG. 5. FIG. 4 is a diagram of a display apparatus 100 according to an embodiment of the present invention. FIG. 5 is a partial sectional diagram of the display apparatus 100 in FIG. 4 along a sectional line A-A'. In this embodiment, the display apparatus 100 could be an LCD (Liquid Crystal Display) television (as shown in FIG. 4), but not limited thereto, meaning that the display apparatus 100 could also be other commonly-seen display device (e.g. an LCD screen of a notebook) instead. As shown in FIG. 4 and FIG. 5, the display apparatus 100 includes a liquid crystal panel 102 and a backlight module 104. The liquid crystal panel 102 has a visible region 106. The backlight module 104 is disposed at a side of the liquid crystal panel 102 for providing a surface light source with sufficient brightness and uniform distribution to the liquid crystal panel 102 for the subsequent image display. The backlight module 104 includes a light guide plate 108, a plurality of light emitting diodes 110, a mesh dot layer 112, and a diffusing tape 114.

Figure 6:
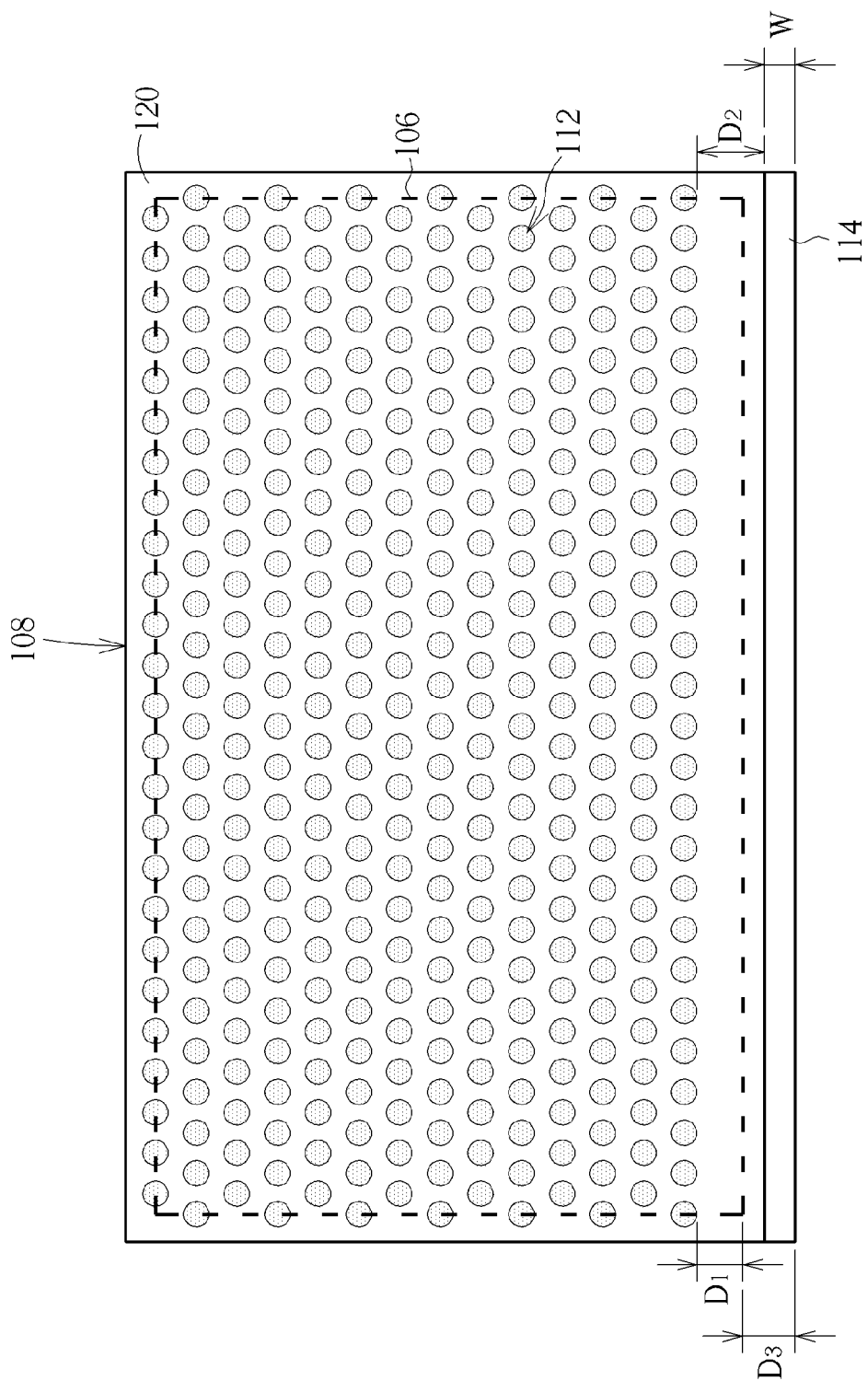
FIG. 6 is a bottom view of a light guide plate in FIG. 5.

More detailed description for components of the backlight module 104 is provided as follows. Please refer to FIG. 5 and FIG. 6. FIG. 6 is a bottom view of the light guide plate 108 in FIG. 5. As shown in FIG. 5 and FIG. 6, the light guide plate 108 has a light exit surface 116, a light entrance surface 118, and a bottom surface 120. The light entrance surface 118 is located between the light exit surface 116 and the bottom surface 120, and the light exit surface 116 is opposite to the bottom surface 120. The plurality of light emitting units 110 is disposed at a position corresponding to the light entrance surface 118 of the light guide plate 108. Each light emitting unit 110 could be a light emitting diode (but not limited thereto) for providing sufficient light to be incident into the light entrance surface 118. The mesh dot layer 112 is disposed on the bottom surface 120 of the light guide plate 108, and a side $S_1$ of the mesh dot layer 112 is shifted inward by a first distance $D_1$ relative to a side $S_2$ of the visible region 106 corresponding to the light entrance surface 118. The diffusing tape 114 is attached to the bottom surface 120 corresponding to the light entrance surface 118 for diffusing light inside the light guide plate 108 to the light exit surface 116.

Via the aforesaid design, since there is no mesh dot layer disposed on a region of the bottom surface 120 close to the light entrance surface 118 (as shown in FIG. 5), the hotspot problem aforementioned in the prior art could be efficiently solved when light emitted by the light emitting unit 110 is incident into the light guide plate 108 via the light entrance surface 118. Furthermore, in this embodiment, via the design in which the diffusing tape 114 is attached to the bottom surface 120 corresponding to the light entrance surface 118, the diffusing tape 114 could diffuse light to the light exit surface 116 when light inside the light guide plate 108 is incident into the diffusing tape 114. In other words, the aforesaid design could further prevent dark lines or dark bands caused by inward shift of the mesh dot layer 112 relative to the visible region 106 from appearing on a region of the light exit surface 116 close to the light entrance surface 118. In such a manner, via the aforesaid designs, the backlight module 104 could provide a surface light source with sufficient brightness and uniform distribution to the liquid crystal panel 102, so as to greatly improve the image display quality and visual comfort of the display apparatus 100.

To be noted, as shown in FIG. 5, a width of the diffusing tape 114 is set as W, a third distance between the light entrance surface 118 and the side $S_2$ of the visible region 106 is set as $D_3$, a thickness of the light guide plate 108 is set as T, and an angle formed by a diffusing path P of light inside the light guide plate 108 and a normal N of the light exit surface 116 is set as θ. Based on the aforesaid setting, in the design that the diffusing tape 114 is attached to the bottom surface 120 in a manner of being aligned with the light entrance surface 118 (as shown in FIG. 5), the first distance $D_1$ and the second distance $D_2$ could be calculated according to the following equations:

$$D_1 = W + D_2 - D_3;$$

$$D_2 = T * \tan(\theta);$$

wherein the angle θ is less than a total-reflection critical angle of the light guide plate 108.

To be more specific, assuming that the light guide plate 108 is made of PMMA (Polymethylmethacrylate) material, of which the refractive index is equal to 1.49, and is disposed in the air, of which the refractive index is equal to 1, the total-reflection critical angle of the light guide plate 108 could be calculated as 42.15 according to the conventional total-reflection critical angle equation (i.e. $\sin^{-1}(1.49/1)$), meaning that the angle θ is less than or equal to 42.15. After the width T of the light guide plate 108 and the third distance $D_3$ are appropriately adjusted and the width W of the diffusing tape 114 is designed to be less than or equal to the third distance $D_3$, the first distance $D_1$ could be designed to be between 1 mm and 2.5 mm according to the aforesaid equations. In such a manner, the aforesaid hotspot problem could be efficiently solved. In practical application, the first distance $D_1$ is preferably equal to 2.5 mm.

It should be mentioned that the diffusing tape 114 is not limited to be aligned with the light entrance surface 118 as shown in FIG. 5. In other words, all the designs of appropriately adjusting the attaching position and the width W of the diffusing tape 114 to solve the aforesaid dark line/band problem would fall within the scope of the present invention. Furthermore, the present invention could also modify the shape, the glue property, the tape color, or the type of the diffusing particle of the diffusing tape 114 to further eliminate the aforesaid dark lines or dark bands.

Compared with the prior art, the present invention utilizes the design in which the mesh dot layer located on the bottom surface of the light guide plate is shifted inward relative to the visible region of the liquid crystal panel, to prevent the bright areas and the dark areas from appearing alternately on the region of the light guide plate close to the light entrance surface. In such a manner, the aforesaid hotspot problem could be efficiently solved. Furthermore, the present invention could further utilize the diffusing tape to be attached to the bottom surface of the light guide plate corresponding to the light entrance surface, so that the aforesaid dark lines or dark bands caused by inward shift of the mesh dot layer relative to the visible region could also be eliminated. Accordingly, the backlight module provided by the present invention could greatly improve the image display quality and the visual comfort of the display apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for providing light to a liquid crystal panel having a visible region, the backlight module comprising:
   a light guide plate having a light exit surface, a bottom surface, and a light entrance surface, the light entrance surface being located between the light exit surface and the bottom surface, the light exit surface being opposite to the bottom surface;
   a plurality of light emitting units disposed at a position corresponding to the light entrance surface of the light guide plate for emitting light to the light entrance surface;
   a mesh dot layer disposed on the bottom surface of the light guide plate, a side of the mesh dot layer corresponding to the light entrance surface being shifted inward by a first distance relative to a side of the visible region corresponding to the light entrance surface; and
   a diffusing tape attached onto the bottom surface corresponding to the light entrance surface for diffusing light in the light guide plate to the light exit surface.

2. The backlight module of claim 1, wherein the diffusing tape is attached to the bottom surface in a manner of being aligned with the light entrance surface, and the first distance is calculated according to the following equations:

the first distance=(a width of the diffusing tape)+(a second distance)−(a third distance between the light entrance surface and the side of the visible region corresponding to the light entrance surface);

the second distance=(a width of the light guide plate) *tan (an angle formed by a diffusing path of light inside the light guide plate and a normal of the light exit surface);

wherein the angle is less than or equal to a total-reflection critical angle of the light guide plate.

3. The backlight module of claim 2, wherein the width of the diffusing tape is less than or equal to the third distance between the light entrance surface and the side of the visible region corresponding to the light entrance surface.

4. The backlight module of claim 3, wherein the first distance is between 1 mm and 2.5 mm.

5. The backlight module of claim 4, wherein the first distance is substantially equal to 2.5 mm.

6. The backlight module of claim 1, wherein the first distance is between 1 mm and 2.5 mm.

7. The backlight module of claim 6, wherein the first distance is substantially equal to 2.5 mm.

8. A display apparatus comprising:
   a liquid crystal panel having a visible region; and
   a backlight module for providing light to the liquid crystal panel, the backlight module comprising:
      a light guide plate having a light exit surface, a bottom surface, and a light entrance surface, the light entrance surface being located between the light exit surface and the bottom surface, the light exit surface being opposite to the bottom surface;
      a plurality of light emitting units disposed at a position corresponding to the light entrance surface of the light guide plate for emitting light to the light entrance surface;
      a mesh dot layer disposed on the bottom surface of the light guide plate, a side of the mesh dot layer corresponding to the light entrance surface being shifted inward by a first distance relative to a side of the visible region corresponding to the light entrance surface; and
      a diffusing tape attached onto the bottom surface corresponding to the light entrance surface for diffusing light in the light guide plate to the light exit surface.

9. The display apparatus of claim 8, wherein the diffusing tape is attached to the bottom surface in a manner of being aligned with the light entrance surface, and the first distance is calculated by the following equations:

the first distance=(a width of the diffusing tape)+(a second distance)−(a third distance between the light entrance surface and the side of the visible region corresponding to the light entrance surface);

the second distance=(a width of the light guide plate) *tan (an angle formed by a diffusing path of light inside the light guide plate and a normal of the light exit surface);

wherein the angle is less than or equal to a total-reflection critical angle of the light guide plate.

10. The display apparatus of claim 9, wherein the width of the diffusing tape is less than or equal to the third distance between the light entrance surface and the side of the visible region corresponding to the light entrance surface.

11. The display apparatus of claim 10, wherein the first distance is between 1 mm and 2.5 mm.

12. The display apparatus of claim 11, wherein the first distance is substantially equal to 2.5 mm.

13. The display apparatus of claim 9, wherein the first distance is between 1 mm and 2.5 mm.

14. The display apparatus of claim 13, wherein the first distance is substantially equal to 2.5 mm.

* * * * *